(12) United States Patent
Amendola

(10) Patent No.: US 7,907,900 B2
(45) Date of Patent: Mar. 15, 2011

(54) METHOD AND APPARATUS THAT MITIGATES THE EFFECTS OF BLUETOOTH-BASED DENIAL OF SERVICE ATTACKS AGAINST MOBILE DEVICES

(75) Inventor: Raffaele G. Amendola, West Chicago, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 620 days.

(21) Appl. No.: 11/851,799

(22) Filed: Sep. 7, 2007

(65) Prior Publication Data
US 2009/0068946 A1 Mar. 12, 2009

(51) Int. Cl.
*H04B 7/00* (2006.01)
*H04M 1/66* (2006.01)
*H04M 1/68* (2006.01)
*H04M 3/16* (2006.01)

(52) U.S. Cl. .................. 455/41.2; 455/41.3; 455/410

(58) Field of Classification Search .............. 455/41.2, 455/41.3, 409, 410, 411, 414.1; 370/338
See application file for complete search history.

(56) References Cited

U.S. PATENT DOCUMENTS 7,484,008 B1 * 1/2009 Gelvin et al. ............... 709/249
2007/0206546 A1 9/2007 Alberth, Jr.

OTHER PUBLICATIONS

Suri et al., "Recalculation of Keys—Solution to the Eavesdrop Attack," IEEE Southeastcon 2008, IEEE Piscataway, NJ, USA, Apr. 3, 2008, pp. 604-606.
Phatak, "Spread-Identity Mechanisms for DOS Resilience and Security," 1st International Conference on Security and Privacy for Emerging Areas in Communications Networks, 2005, SecureComm 2005, Sep. 5-9, 2005, pp. 23-34.

* cited by examiner

*Primary Examiner* — Eugene Yun
(74) *Attorney, Agent, or Firm* — Matthew C. Loppnow; Prass LLP

(57) ABSTRACT

A method and apparatus that mitigates the effects of a Bluetooth-based Denial of Service (DoS) attack on a Bluetooth-enabled mobile communications device is disclosed. The method may include determining if the mobile communications device is under a DoS attack, wherein if it is determined that the mobile communications device is under a DoS attack, the method may include temporarily disabling Bluetooth services that were enabled using a first Bluetooth address, storing the first Bluetooth address in a memory in the mobile communications device, changing the first Bluetooth address to a second Bluetooth address, and enabling Bluetooth services using the second Bluetooth address.

20 Claims, 3 Drawing Sheets

METHOD AND APPARATUS THAT MITIGATES THE EFFECTS OF BLUETOOTH-BASED DENIAL OF SERVICE ATTACKS AGAINST MOBILE DEVICES

BACKGROUND OF THE DISCLOSURE

1. Field of the Disclosure

This disclosure relates to the mitigation of risk of Bluetooth-based Denial of Service (DoS) attacks against mobile devices equipped with Bluetooth technology.

2. Introduction

A mobile communications device equipped with Bluetooth technology may be vulnerable to a Denial of Service (DoS) attack. In a Bluetooth-based DoS attack, an attacking device sends a rapid stream of Bluetooth messages to a victim device. This rapid stream of Bluetooth messages may impair the function of the victim device by depleting its battery power, flooding its display with Bluetooth messages, blocking legitimate Bluetooth messages, etc. As such, the limited resources of the victim device render this attack especially effective.

In order to mitigate the effects of a DoS attack, conventional techniques dictate that the victim device block the Bluetooth address of the attacking device. However, this countermeasure is ineffective since the attacking device may change Bluetooth addresses throughout the attack.

SUMMARY OF THE DISCLOSURE

A method and apparatus that mitigates the effects of a Bluetooth-based Denial of Service (DoS) attack on a Bluetooth-enabled mobile communications device is disclosed. The method may include determining if the mobile communications device is under a DoS attack, wherein if it is determined that the mobile communications device is under a DoS attack, the method may include temporarily disabling Bluetooth services that were enabled using a first Bluetooth address, storing the first Bluetooth address in a memory in the mobile communications device, changing the first Bluetooth address to a second Bluetooth address, and enabling Bluetooth services using the second Bluetooth address.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION OF THE DISCLOSURE

Additional features and advantages of the disclosure will be set forth in the description which follows, and in part will be obvious from the description, or may be learned by practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth herein.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosure comprises a variety of embodiments, such as a method and apparatus and other embodiments that relate to the basic concepts of the disclosure.

This disclosure concerns the recasting of a mobile communication device's Bluetooth address in response to a Bluetooth-based Denial of Service (DoS) attack. In a Bluetooth-based DoS attack, the attacking device attacks the victim device by sending a high volume of messages, such as a rapid stream of messages, to the particular Bluetooth address of the victim device. In an embodiment of this disclosure, the mobile communication device may change its Bluetooth address, thereby altering the physical characteristics of the communication channel, so that the victim device will not receive Bluetooth messages from the attacking device.

Figure 1:
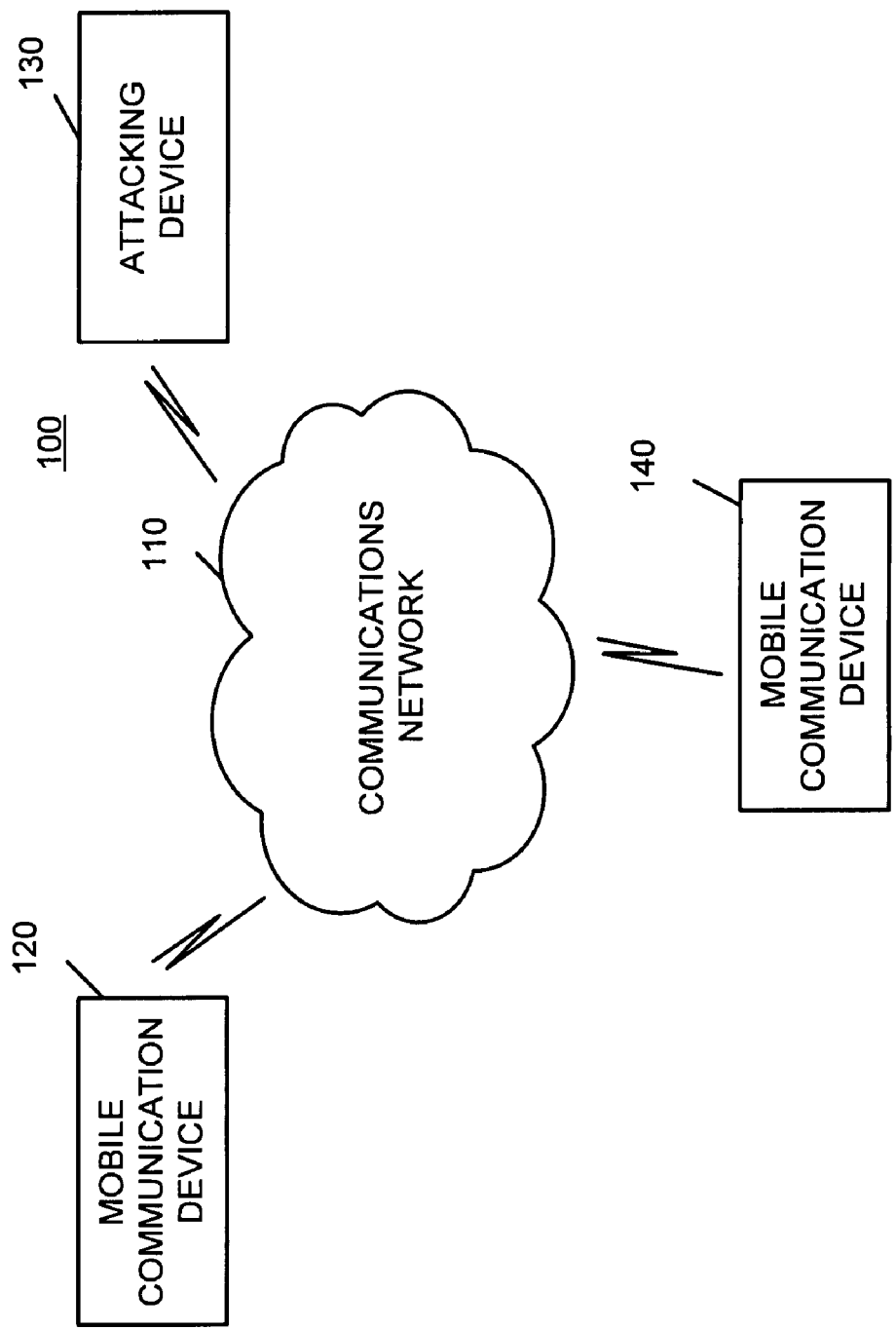
FIG. 1 illustrates an exemplary diagram of a mobile communication system in accordance with a possible embodiment of the disclosure.

FIG. 1 illustrates an exemplary diagram of a mobile communication system 100 in accordance with a possible embodiment of the disclosure. The mobile communication system 100 may include mobile communication devices 120, 140 and attacking device 130 connected through communications network 110.

Communications network 110 may represent any network that may transmit and receive Bluetooth wireless signals.

The mobile communication device 120, 140 may be any device capable of sending and receiving communication signals and capable of using Bluetooth technology. For example, the mobile communication device 120, 140 may be a wireless telephone, cellular telephone, mobile telephone, portable MP3 player, satellite radio receiver, AM/FM radio receiver, satellite television, portable laptop, portable computer, wireless radio, portable digital video recorder, or personal digital assistant PDA), for example.

The attacking device 130 may be any device capable of sending and receiving communication signals, including sending Bluetooth messages. For example, the attacking device 130 may be a computer, personal computer, server, wireless telephone, cellular telephone, mobile telephone, satellite radio transmitter, portable laptop, portable computer, wireless radio, or PDA, for example.

In accordance with this disclosure, the attacking device 130 may invoke tactics to prevent the mobile communication device 120 from adequately using its own resources including its ability to communicate with other mobile communication devices 140. Such tactics may include the attacking device 130 sending large quantities of Bluetooth messages to the mobile communication device 120 so that all or a substantial portion of the mobile communication device's resources are consumed. The mobile communication device 120 invokes the processes of the exemplary embodiments described herein to combat such an attack.

Figure 2:
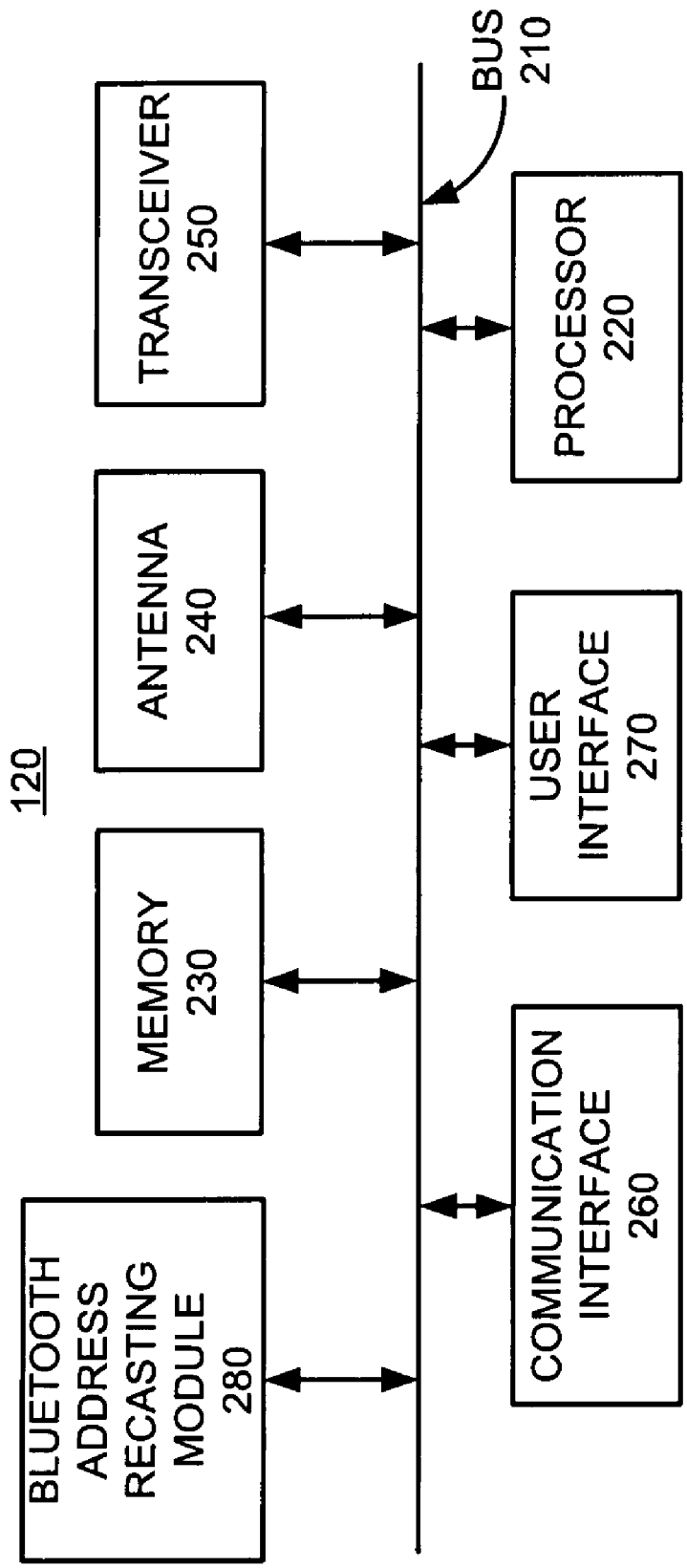
FIG. 2 illustrates an exemplary diagram of a mobile communication device in accordance with a possible embodiment of the disclosure.

FIG. 2 illustrates a block diagram of a mobile communication device 120. The mobile communications device 120 may include a bus 210, a processor 220, a memory 230, an antenna 240, a transceiver 250, a communication interface 260, user interface 270, and Bluetooth address recasting module 280. Bus 210 may permit communication among the components of the mobile communication device 120.

Processor 220 may include at least one conventional processor or microprocessor that interprets and executes instructions. Memory 230 may be a random access memory (RAM) or another type of dynamic storage device that stores information and instructions for execution by processor 220. Memory 230 may also include a read-only memory (ROM) which may include a conventional ROM device or another type of static storage device that stores static information and instructions for processor 220.

Transceiver 250 may include one or more transmitters and receivers. The transceiver 250 may include sufficient functionality to interface with any network or communications station and may be defined by hardware or software in any manner known to one of skill in the art. The processor 220 is cooperatively operable with the transceiver 250 to support operations within the communications network 110. The transceiver 250 transmits and receives transmissions via the antenna 240 in a manner known to those of skill in the art.

Communication interface 260 may include any mechanism that facilitates communication via the network 110. For example, communication interface 260 may include a modem. Alternatively, communication interface 260 may include other mechanisms for assisting the transceiver 250 in communicating with other devices and/or systems via wireless connections.

User interface 270 may include one or more conventional input/output mechanisms that permit a user to input information and communicate with the mobile communication device 120, such as a microphone, touchpad, keypad, display, keyboard, mouse, pen, stylus, voice recognition device, buttons, one or more speakers, etc.

The mobile communication device 120 may perform such functions in response to processor 220 by executing sequences of instructions contained in a computer-readable medium, such as, for example, memory 230. Such instructions may be read into memory 230 from another computer-readable medium, such as a storage device or from a separate device via communication interface 260.

The details of the operation of the Bluetooth address recasting module 280 will be found below in the discussion of the exemplary flowchart in FIG. 3.

Figure 3:
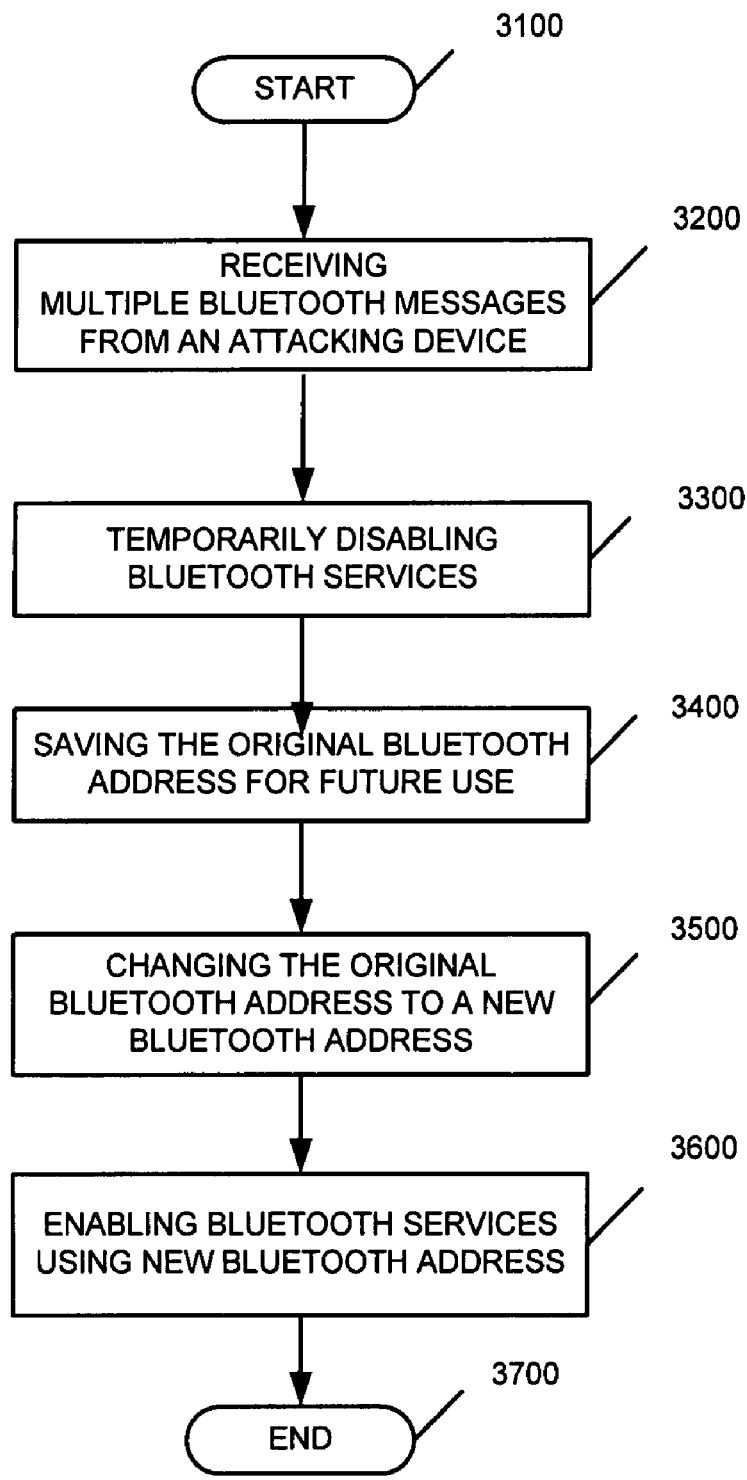
FIG. 3 is an exemplary flowchart illustrating one possible Bluetooth address recasting process in accordance with one possible embodiment of the disclosure.

FIG. 3 is an exemplary flowchart illustrating one possible Bluetooth address recasting process in accordance with one possible embodiment of the disclosure. The process begins at step 3100 and continues to step 3200 where the Bluetooth address recasting module 280 may determine if the mobile communications device is under a DoS attack. In a Bluetooth-based DoS attack, the attacking device 130 may send a rapid stream of messages to the particular Bluetooth address of the mobile communication device 120. The recasting of the Bluetooth address of the mobile communication device 120 may be initiated by the user or automatically by the mobile communication device 120 once the number or rate of Bluetooth events, such as connections, has passed a predetermined threshold, for example.

If it is determined that the mobile communications device 120 is under a DoS attack, then at step 3300, the Bluetooth address recasting module 280 may temporarily disable Bluetooth services that were enabled using a first Bluetooth address. At step 3400, the Bluetooth address recasting module 280 may store the first Bluetooth address in a memory 230 in the mobile communications device 110. This will enable the first Bluetooth address to be used after the DoS threat is removed, such as when the mobile communication device 120 is operated in a different location or after a particular time period expires, for example.

At step 3500, the Bluetooth address recasting module 280 may change the first Bluetooth address to a second Bluetooth address. In changing its Bluetooth address, the physical characteristics of the Bluetooth communication channel are altered and the mobile communication device 120 will not receive Bluetooth messages from the attacking device 130. The Bluetooth address may be selected at random or be pre-designated as part of an address stack, for example. At step 3600, the Bluetooth address recasting module 280 may enable Bluetooth services using the second Bluetooth address. The process then goes to step 3700 and ends.

Although the above description may contain specific details, they should not be construed as limiting the claims in any way. Other configurations of the described embodiments of the disclosure are part of the scope of this disclosure. The appended claims and their legal equivalents should only define the disclosure, rather than any specific examples given.

I claim:

1. A method for mitigating the effects of a short range wireless connection-based Denial of Service (DoS) attack on a short range wireless connection-enabled mobile communications device, comprising:
   determining if the mobile communications device is under a DoS attack, wherein if it is determined that the mobile communications device is under a DoS attack,
   temporarily disabling short range wireless connection services that were enabled using a first short range wireless connection address;
   changing the first short range wireless connection address to a second short range wireless connection address on the mobile communications device; and
   enabling short range wireless connection services by the mobile communications device using the second short range wireless connection address.

2. The method of claim 1, wherein the first short range wireless connection address is changed to the second short range wireless connection address automatically.

3. The method of claim 1, wherein the determining step further comprises:
   receiving multiple short range wireless connection messages; and
   determining if the multiple short range wireless connection messages exceed a threshold.

4. The method of claim 3, wherein the threshold is based on one of a number of short range wireless connection messages received and a time period in which the short range wireless connection messages are received.

5. The method of claim 1, further comprising:
   prompting a user to change the first short range wireless connection address to the second short range wireless connection address; and
   receiving a signal from the user to change the first short range wireless connection address to the second short range wireless connection address.

6. The method of claim 1, further comprising:
   associating the second short range wireless connection address with stored metadata associated with the first short range wireless connection address.

7. The method of claim 1, further comprising:
   storing the first short range wireless connection address in a memory in the mobile communications device,
   wherein the second short range wireless connection address is changed to the first short range wireless connection address after one of an expired time period and a change in location of the mobile communications device.

8. An apparatus that mitigates the effects of a short range wireless connection-based Denial of Service (DoS) attack on a short range wireless connection-enabled mobile communications device, comprising:
   a memory; and
   a short range wireless connection address recasting module that determines if the mobile communications device is under a DoS attack, wherein if it is determined that the mobile communications device is under a DoS attack, the short range wireless connection address recasting module temporarily disables short range wireless connection services that were enabled using a first short range wireless connection address, changes the first short range wireless connection address to a second short range wireless connection address, and enables short range wireless connection services using the second short range wireless connection address.

9. The apparatus of claim 8, wherein the short range wireless connection address recasting module changes the first short range wireless connection address to the second short range wireless connection address automatically.

10. The apparatus of claim 8, wherein the short range wireless connection address recasting module determines whether the mobile communications device is under a DoS attack by receiving multiple short range wireless connection messages, and determining if the multiple short range wireless connection messages exceed a threshold.

11. The apparatus of claim 10, wherein the threshold is based on one of a number of short range wireless connection messages received and a time period in which the short range wireless connection messages are received.

12. The apparatus of claim 8, wherein the short range wireless connection address recasting module prompts a user to change the first short range wireless connection address to the second short range wireless connection address, and receives a signal from the user to change the first short range wireless connection address to the second short range wireless connection address.

13. The apparatus of claim 8, wherein the short range wireless connection address recasting module associates the second short range wireless connection address with stored metadata associated with the first short range wireless connection address.

14. The apparatus of claim 8, wherein the short range wireless connection address recasting module stores the first short range wireless connection address in the memory in the mobile communications device and changes the second short range wireless connection address to the first short range wireless connection address after one of an expired time period and a change in location of the mobile communications device.

15. A mobile communication device that mitigates the effects of a short range wireless connection-based Denial of Service (DoS) attack on a short range wireless connection-enabled mobile communications device, comprising:
   a memory;
   a user interface to facilitate a user's interaction with the mobile communication device; and
   a short range wireless connection address recasting module that determines if the mobile communications device is under a DoS attack, wherein if it is determined that the mobile communications device is under a DoS attack, the short range wireless connection address recasting module temporarily disables short range wireless connection services that were enabled using a first short range wireless connection address, changes the first short range wireless connection address to a second short range wireless connection address, and enables short range wireless connection services using the second short range wireless connection address.

16. The mobile communication device of claim 15, wherein the short range wireless connection address recasting module determines whether the mobile communications device is under a DoS attack by receiving multiple short range wireless connection messages, and determining if the multiple short range wireless connection messages exceed a threshold, and the threshold is based on one of a number of short range wireless connection messages received and a time period in which the short range wireless connection messages are received.

17. The mobile communication device of claim 16, wherein the short range wireless connection address recasting module prompts the user to change the first short range wireless connection address to the second short range wireless connection address, and receives a signal from the user through the user interface to change the first short range wireless connection address to the second short range wireless connection address.

18. The mobile communication device of claim 15, wherein the short range wireless connection address recasting module associates the second short range wireless connection address with stored metadata associated with the first short range wireless connection address.

19. The mobile communication device of claim 15, wherein the short range wireless connection address recasting module stores the first short range wireless connection address in the memory in the mobile communication device, and changes the second short range wireless connection address to the first short range wireless connection address after one of an expired time period and a change in location of the mobile communication device.

20. The mobile communication device of claim 15, wherein the short range wireless connection comprises a Bluetooth connection.

* * * * *